United States Patent [19]

Gray

[11] 4,405,986
[45] Sep. 20, 1983

[54] GSP/DOPPLER SENSOR VELOCITY DERIVED ATTITUDE REFERENCE SYSTEM

[75] Inventor: Jack Gray, Bricktown, N.J.

[73] Assignee: The United States of America as represented by the Secretary of the Army, Washington, D.C.

[21] Appl. No.: 255,030

[22] Filed: Apr. 17, 1981

[51] Int. Cl.³ .......................... G06F 15/50; G06G 7/78
[52] U.S. Cl. .................................... 364/434; 364/453; 364/455
[58] Field of Search ............... 364/434, 447, 453, 455, 364/456, 454; 340/27 AT

[56] References Cited

U.S. PATENT DOCUMENTS

| | | | |
|---|---|---|---|
| 4,070,674 | 1/1978 | Buell et al. | 364/453 X |
| 4,095,271 | 6/1978 | Muller | 364/434 |
| 4,106,094 | 8/1978 | Land | 364/453 |
| 4,134,681 | 1/1979 | Elmer | 364/434 X |
| 4,212,443 | 7/1980 | Duncan et al. | 364/453 X |
| 4,232,313 | 11/1980 | Fleishman | 364/453 X |

*Primary Examiner*—Jerry Smith
*Attorney, Agent, or Firm*—Robert P. Gibson; Jeremiah G. Murray; Edward P. Griffin, Jr.

[57] ABSTRACT

An accurate and constantly updated attitude instrument is provided for aircraft. The pitch and roll angles are calculated from two sets of velocity measurements, one set being derived from signals received from orbiting navigational satellites and the other set from on-board equipment which determines the aircraft's axial velocities. The on-board equipment may be a Doppler ground-speed sensor or an inertial system using accelerometers, the outputs of which are integrated to derive the axial velocities.

4 Claims, 5 Drawing Figures

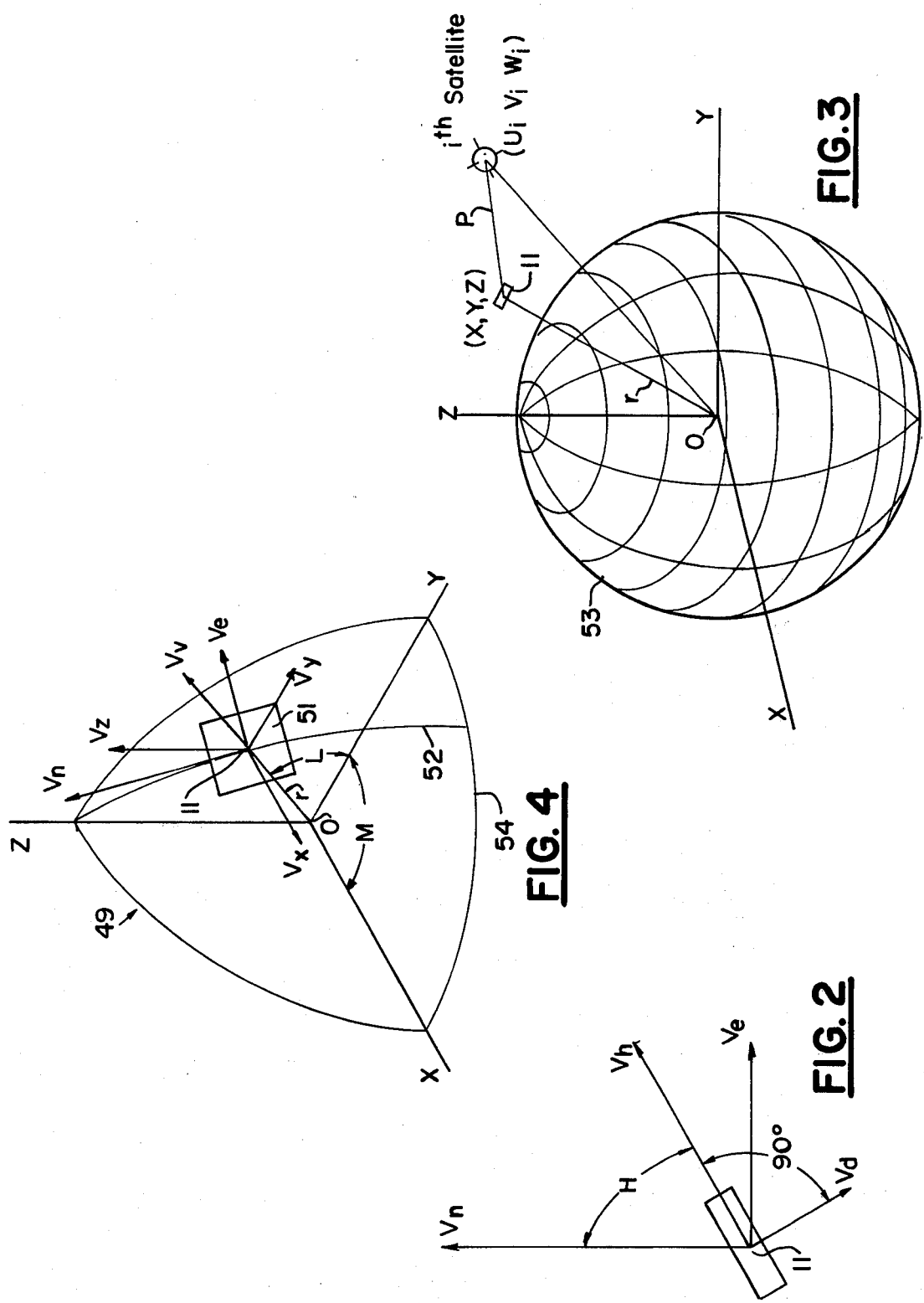

GSP/DOPPLER SENSOR VELOCITY DERIVED ATTITUDE REFERENCE SYSTEM

The invention described herein may be manufactured, used, and licensed by or for the Government for governmental purposes without the payment to me of any royalties thereon.

BACKGROUND OF THE INVENTION

This invention relates to an aircraft instrument, and more particularly to a novel attitude reference instrument which determines the aircraft's instantaneous pitch and roll angles from a plurality of measured aircraft velocities. Some of the velocities are obtained from a satellite navigation system, for example, the Global Positioning System, known as the GPS NAVSTAR, and other of the velocities are obtained from on-board velocity measuring equipment, for example a Doppler radar sensor, which may form a portion of a standard Doppler navigator, for example, the AN/ASN-128.

The invention provides an attitude reference which is not directly dependent on the use of gyroscopes and thus obviates many of the disadvantages of these instruments. For example, gyroscopes are subject to tumbling if the aircraft exceeds certain limits of pitch and/or roll, as well as precession and drift errors.

The present invention can function as a redundant backup system for a conventional gyro type attitude reference and can also be used for dynamic calibration and alignment of such a gyro attitude reference.

A co-pending application of the present inventor entitled, HYBRID VELOCITY DERIVED HEADING REFERENCE SYSTEM, Ser. No. 246,518, filed Mar. 23, 1981, discloses and claims a system for deriving a heading reference from velocities obtained from a satellite navigation system such as the GPS NAVSTAR, as well as other velocities obtained from on-board velocity measuring means such as a Doppler sensor.

SUMMARY OF THE INVENTION

The aircraft is provided with an antenna atop its fuselage which conveys signals from a plurality of orbiting navigation satellites to a receiver/processor. Each satellite transmits a range signal and a range rate signal. The receiver/processor correlates the received signals with stored ephemeris information regarding the orbits of all the satellites and yields from this information three velocities, namely $V_n$, $V_e$, and $V_v$. These are further correlated with the output of a heading reference, for example a directional gyro, to obtain two additional velocities, $V_h$ and $V_d$, these being the along-track and cross-track velocities, respectively, in a plane tangent to the earth at the location of the aircraft.

The doppler sensor by means of well known techniques, radiates a plurality of radar beams toward the earth and determines the aircraft's ground speeds along its roll, pitch and yaw axes. These speeds are $V_x$, $V_y$, and $V_z$ respectively.

In a pitching and rolling aircraft, the Doppler-derived velocities will undergo cyclic variations caused by the attitude changes, for example, if the aircraft cyclically pitches, the Doppler beams will undergo a corresponding back and forth motion which will modulate the velocity $V_x$ along the roll axis at the pitching rate and by an amount related to the amplitude of the pitching motion. This modulation due to pitching will be superimposed on the speed $V_x$ which would obtain in the absence of pitching, that is if the aircraft were flying straight and level in smooth air. Since the satellite-derived velocities, $V_h$, $V_d$, and $V_v$ are true ground speeds which include the effects of all aircraft motion including pitching and rolling, correlation or comparison of the satellite-derived velocities with the Doppler-derived velocities can yield pitch and roll information. This correlation or comparison takes place in a velocity processor to which the six velocities are applied. This circuit processes its inputs in accordance with an algorithm to be presented.

Instead of using Doppler radar equipment to obtain the three aircraft axial velocities, strapped-down accelerometers may be used to measure aircraft acceleration along its three orthogonal axes, and their outputs integrated to obtain the three axial velocities, which are correlated with the along-track and cross-track velocities to obtain the desired pitch and roll information.

It is thus an objective of this invention to show how velocities derived from two separate velocity measuring systems, namely the NAVSTAR GPS satellite navigation system and a Doppler radar sensor, for example, the AN/ASN-128, when combined with a heading reference, for example, the output of a directional gyro, can yield accurate, instantaneous attitude information for an aircraft.

Another object of the invention is to provide circuitry for determining the pitch and roll of an aircraft by utilizing a plurality of velocity measurements derived from two separate sources and heading information from a heading reference.

A further object of the invention is to provide an indication of an aircraft's instantaneous pitch and roll which is not subject to gyro drift error or gyro tumbling and which can be used either as a primary attitude instrument or as a backup for conventional attitude indicators, or as a calibration standard therefor.

BRIEF DESCRIPTION OF THE DRAWINGS

FIG. 2 is a vector diagram showing the relationship between the satellite-derived velocities and the along-track and cross-track velocities.

FIGS. 3 and 4 are coordinate systems showing how the GPS-derived velocities are obtained and transformed from one coordinate system to another.

DETAILED DESCRIPTION OF A PREFERRED EMBODIMENT

Figure 5:
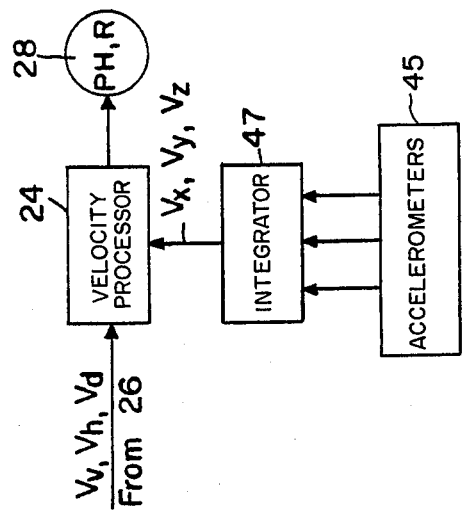
FIG. 5 shows how the circuitry of FIG. 1 would be modified if accelerometers and integrators were used to obtain the three aircraft axial velocities.

The GPS system, officially designated as NAVSTAR GPS, is a satellite referenced radio navigation system consisting of 24 satellites orbiting in three different planes and spaced along their orbits such that four or more satellites are visible at all times at any place on earth. A ground tracking network periodically measures and updates the ephermeris of each satellite and keeps all satellite clocks synchronized. Each satellite continually transmits orthogonally binary coded ranging signals to users. By using a code correlation detector, the GPS user can measure the time delay of the transmitted signal. This time delay not only includes the signal propagation delay but also the clock bias and clock bias rate differences between the user's clock and the satellite clocks. The GPS user equipment comprising an antenna and a receiver/processor connected thereto, can be used to determine user position and velocity by measuring the GPS signal time of arrival together with GPS signal Doppler shift. This is done by receiving all available satellite signals from which four satellites are selected to establish four independent pseudo range and pseudo range rates. Since the user's clock bias, or error, is common to all range measurements, it induces a time error into these measurements which is directly related to the range error by a constant factor, namely the speed of light. Therefore, the clock bias, which is actually a phase difference using quartz clocks, can be treated as a bias error source in the range measurement. Thus the initially measured range is referred to as a pseudo range rather than a true range. The pseudo range measurement, $P_i$, is a scalar quantity equal to the biased magnitude of the vector difference between the user's position and the satellite position. In the absence of clock error, only three range and range rate measurements would be necessary to completely specify the user's position and velocity, given the satellites positional information or ephemeris. However, by measuring four so-called pseudo ranges and pseudo-range rates, the unknown user clock bias or error can be determined as well as the position and velocity, since four equations are available for simultaneous solution. Exactly how the desired information is processed to obtain the required velocity measurement will be explained below.

The present invention is intended for use with the GPS system or with its functional equivalent.

The invention will be described in connection with the illustrative embodiment shown in FIG. 1. The aircraft 11 therein includes an antenna 21 atop its fuselage where it has an unobstructed view of four GPS orbiting satellites 13, 15, 17, and 19. The received GPS signals are applied by the antenna to GPS receiver/processor 23 where the north velocity $V_n$, the east velocity $V_e$, and the vertical velocity $V_y$ are derived therefrom, in a manner to be explained. A heading reference 36, which may be a conventional directional gyro, provides a continuous heading signal, H. The velocities $V_n$, $V_e$, and $V_y$ are applied to converter 26, together with the heading signal H. The converter 26 calculates from these inputs two additional velocities, namely $V_h$ and $V_d$, these being the along-track and cross-track velocities of the aircraft, respectively. The vector diagram of FIG. 2 shows the relationships between these velocities. $V_n$ is the velocity of the aircraft along the local meridian and $V_e$ is its velocity along the local parallel of latitude. FIG. 2 shows the aircraft 11 at the origin of the coordinate system with velocity $V_h$ along its heading and drift or cross-track velocity of $V_d$ at a 90° angle thereto. The heading angle H is that between true north and $V_h$. All of these velocities are in a plane parallel to the earth at the position of the aircraft. FIG. 4 illustrates such a plane tangent to a sector of the earth. Since the north velocity must be equal to the northerly component of the vector sum of $V_h$ and $V_d$, the following equation can be written, $$V_n = V_h \cos - V_d \sin H \qquad \text{Eq. (1)}$$

Also, the east velocity $V_e$ must be equal to the easterly component of the vector sum of $V_h$ and $V_d$, thus, $$V_e = V_d \cos H + V_h \sin H \qquad \text{Eq. (2)}$$

When these two simultaneous equations are solved, the following values for $V_h$ and $V_d$ are obtained, $$V_h = V_n \cos H + V_e \sin H \qquad \text{Eq. (3)}$$

and $$V_d = V_e \cos H - V_n \sin H \qquad \text{Eq. (4)}$$

Figure 1:
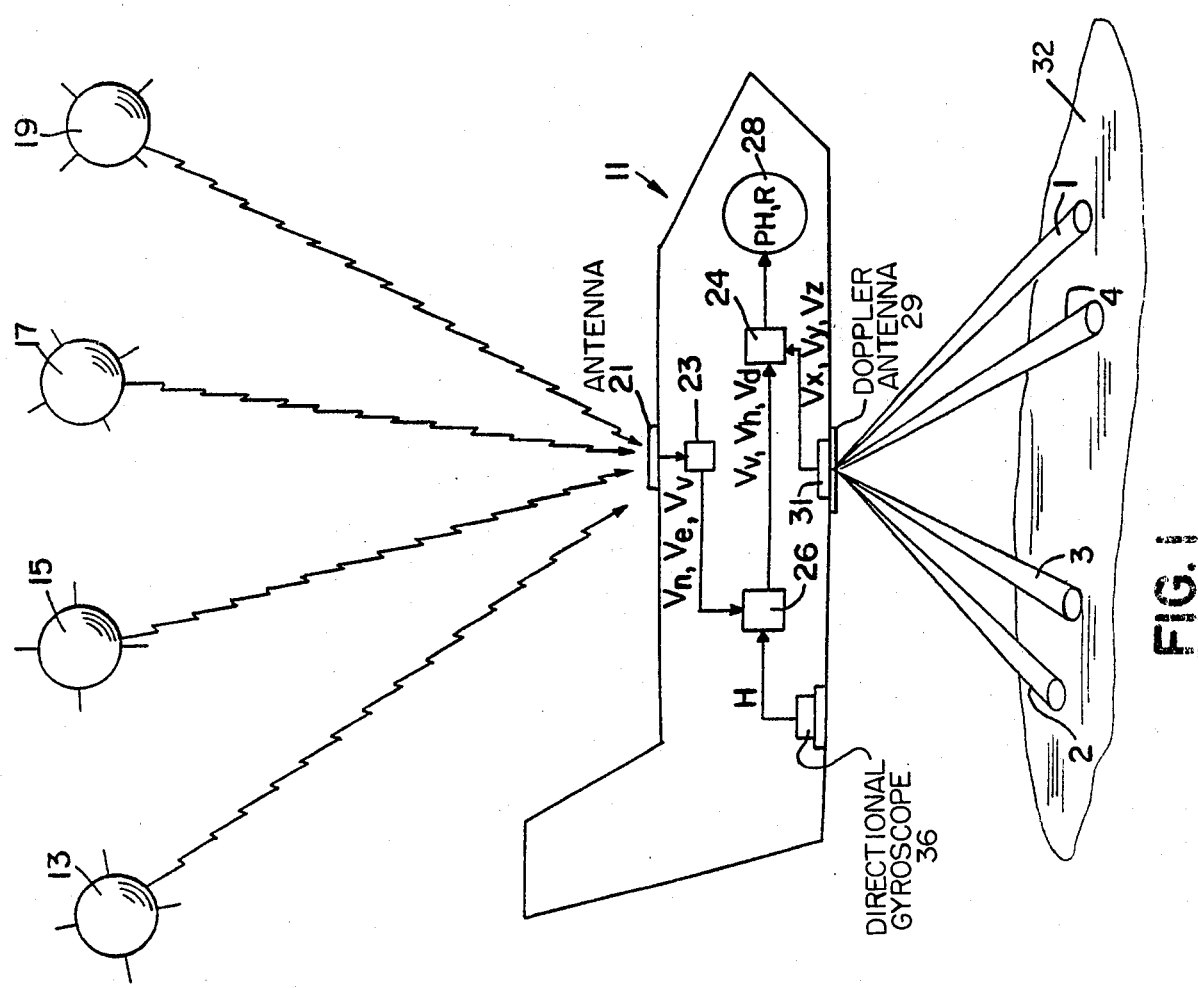
FIG. 1 is a pictorial-block diagram of an illustrative embodiment of the invention.

The circuit of converter 26 of FIG. 1 is designed to calculate these two velocities by carrying out the operations indicated by equations (3) and (4). The vertical velocity $V_y$ also appears at the output of converter 26. It is merely passed through this circuit.

The aircraft includes on its underside a Doppler antenna array 29 adapted to radiate four beams of microwave energy 1, 2, 3, and 4 toward the earth 32, and receive backscattered energy therefrom. The Doppler receiver/processor 31 receives the backscattered echo signals, correlates them with a sample of the transmitted signal to obtain the Doppler signals indictive of the aircraft's velocity along its three orthogonal axis, $V_x$, $V_y$, and $V_z$. These axial velocities are those along the roll, pitch and yaw axes, respectively. The velocities $V_x$ and $V_y$ are not necessarily parallel to or tangent to the earth, unless the aircraft is flying straight and level in smooth air. As explained above, thes axial velocities are constantly changing in direction due to pitching and rolling of the aircraft. In a conventional Doppler navigator, these axial velocities would be correlated with pitch and roll information obtained from a vertical gyro or the like, to obtain the along-track and cross-track velocities. Since these velocities are available from the output of converter 26, correlation between $V_h$, $V_d$, and $V_x$, $V_y$, and $V_z$ should yield the pitch and roll information usually obtained from a vertical gyro. This correlation or calculation is performed by velocity processor 24 which solves an equation or algorithm to be derived below to obtain the instantaneous pitch and roll angles of the aircraft. These angles are applied to attitude readout 28 which can be mounted on the aircraft's panel for the benefit of the crew and also used for the other purposes discussed above.

The global diagram of FIG. 3 illustrates how the GPS receiver circuitry calculates the GPS velocities. The diagram is a Cartesian Earth-centered reference (ECR) coordinate system with the origin, O, of the mutually orthogonal X, Y and Z axes at the center of the earth. The vehicle 11 with the present invention aboard is shown at coordinates X, Y and Z, with the $i^{th}$, satellite at coordinates $U_i$, $V_i$ and $W_i$. The symbol r represents the radius of the earth which passes through the vehicle 11 and P the range of the $i^{th}$ satellite.

The position fixing equation for the vehicle 11 is:

$$\sum_{i=1}^{4} (P_i + B)^2 = (U_i - X)^2 + (V_i - Y)^2 + (W_i - Z)^2 \qquad \text{Eq. (5)}$$

wherein; $P_i$ equals the measured pseudo range, B is the satellite to user clock bias. Four equations of this sort can be written and solved for the four unknowns, namely the vehicle position X, Y and Z and the clock bias B. This vehicle position information is then used in the next set of calculations to derive the range rate information or relative velocities of the vehicle and each of the four satellites. As in the positioning problem, a bias exists between the user and satellite clocks affecting range rate measurements. Doppler information is extracted from detected signal frequencies to yield range rate data. A frequency bias (or clock bias rate) in the user's clock, relative to the satellite clock frequencies, adds an error to the measurements, such that a pseudo range rate is actually measured. This pseudo range rate, also a scalar quantity, is the biased magnitude of the vector difference, along the line of sight, between the user's velocity and the satellite velocity. The GPS velocity fixing equations are:

$$\sum_{i=1}^{4} \dot{P}_i + \dot{B} = \frac{(X - U_i)(\dot{X} - \dot{U}_i) + (Y - V_i)(\dot{Y} - \dot{V}_i) + (Z - W_i)(\dot{Z} - \dot{W}_i)}{RHO_i} \quad \text{Eq. (6)}$$

wherein, $\dot{X}$, $\dot{Y}$ and $\dot{Z}$ are the vehicle velocities, $\dot{P}_i$ is the measured pseudo range rate and $\dot{U}$, $\dot{V}$ and $\dot{W}$, are the satellite velocities along the three coordinate axes, obtained from the orbital data stored in memory, B is the satellite to user clock bias rate or frequency bias, and, $$\sum_{i=1}^{4} RHO_i = [(X - U_i)^2 + (Y - V_i)^2 + (Z - W_i)^2]^{\frac{1}{2}} \quad \text{Eq. (7)}$$

Thus $RHO_i$ is the positional information obtained in the preceding step. Four simultaneous equations like Eq. (6) can be written for each of the four satellites and can be solved to yield all four unknowns. The results are the vehicle velocities along the X, Y and Z axes of FIG. 3.

In order to derive the required $V_n$ and $V_e$ velocities it is necessary to transfer to a spherical coordinate system since the earth's latitude and longitude system is based thereon. FIG. 4 illustrates how this transformation is made. In FIG. 4, 49 represents a sector of the earth, with r the earth's radius and the X, Y and Z coordinate system of FIG. 3 drawn thereon. Point O indicates the earth's center and the plane 51 represents a plane tangent to the earth at the location of the vehicle 11. The local meridian 52 is shown. The angle of latitude L of the vehicle is the angle which radius r makes with the equator 54, measured along the local meridian 52. The angle M between the X axis and the local meridian is the longitude. The previously derived velocities $V_x$, $V_y$ and $V_z$ are shown, together with the required transformation thereof, $V_n$ and $V_e$. $V_v$ is the radial component of velocity along an extension of the earth's radius r. The vehicle velocities, $V_x$, $V_y$ and $V_z$ are the same velocities indicated by the symbols $\dot{X}$, $\dot{Y}$ and $\dot{Z}$ in Eq. (6).

$$\dot{X} = V_x = -V_n \sin L \cos M + V_v \cos L \cos M - V_e \sin M \quad \text{Eq. (8)}$$

$$\dot{Y} = V_y = V_v \cos L \sin M + V_e \cos M - V_n \sin L \sin M \quad \text{Eq. (9)}$$

$$\dot{Z} = V_z = V_v \sin L + V_n \cos L \quad \text{Eq. (10)}$$

wherein, L=Arcsin Z/R=Latitude, M=Arccos X/RcosL=Longitude, and $r = (X^2 + Y^2 + Z^2)^{.5}$.

The solution of these simultaneous equations will give the user his $V_n$, $V_v$ and $V_e$ velocities. The velocity of rotation of the earth at the local latitude must be subtracted from the $V_e$ to obtain the easterly velocity relative to the earth's surface.

All of these mathematical operations are automatically performed by the circuitry designated GPS receiver/processor (23), using information received from the satellites.

The relationship of the aforementioned axial velocities $V_x$, $V_y$, and $V_z$ to the along-track and cross-track velocities $V_h$ and $V_d$ and to the pitch angle, PH, and roll angle R, is given by the following matrix, Eq. (11)
$$\begin{bmatrix} V_h \\ V_d \\ -V_v \end{bmatrix} = \begin{bmatrix} \cos PH & \sin PH \sin R & \sin PH \cos R \\ 0 & \cos R & -\sin R \\ -\sin PH & \cos PH \sin R & \cos PH \cos R \end{bmatrix} \cdot \begin{bmatrix} V_x \\ V_y \\ V_z \end{bmatrix}$$

A Doppler navigator utilizes this relationship to derive the along-track and cross-track velocities from the axial velocities and pitch and roll information. The derivation of this matrix is discussed in detail in the aforementioned co-pending application of the present inventor.

The algorithm or formula used by velocity processor 24 is determined as follows:

The first two equations from the above matrix, equation (11), are as follows, $$V_h = V_x \cos PH + V_y \sin PH \sin R + V_z \sin PH \cos R \quad \text{Eq. (12)}$$

$$V_d = V_y \cos R - V_z \sin R \quad \text{Eq. (13)}$$

The roll of the aircraft can be obtained from equation (13), rearranged as follows, $$V_d + V_z \sin R = V_y \cos R \quad \text{Eq. (14)}$$

Squaring both sides yields, $$V_d^2 + 2V_d V_z \sin R + V_z^2 \sin^2 R = V_y^2 \cos^2 R \quad \text{Eq. (15)}$$

Applying the trigonometric identity, $\cos^2 R = 1 - \sin^2 R$, yields, $$V_d^2 + 2V_d V_z \sin R + V_z^2 \sin^2 R = V_y^2 (1 - \sin^2 R) \quad \text{Eq. (16)}$$

Combining terms yields, $$[V_d^2 - V_y^2] + (V_z^2 + V_y^2) \sin^2 R + 2V_d V_z \sin R = 0 \quad \text{Eq. (17)}$$

Rearranging terms yields, $$\sin^2 R + \frac{2V_d V_z}{V_z^2 + V_y^2} \sin R + \frac{V_d^2 - V_y^2}{V_z^2 + V_y^2} = 0 \quad \text{Eq. (18)}$$

Equation (18) is now in quadratic form and can be solved for its roots, sin R, as follows, $$\sin R = -\frac{V_d V_z}{V_z^2 + V_y^2} \pm \left[ \left[ \frac{V_d V_z}{V_z^2 + V_y^2} \right]^2 - \left[ \frac{V_d^2 - V_y^2}{V_z^2 + V_y^2} \right] \right]^{\frac{1}{2}} \quad \text{Eq. (19)}$$

Therefore the angle of roll is the arcsine of the right side of equation (19).

It should be noted that this mathematical proof shows that the angle of roll can be determined from velocity measurements only. It should be noted that equation

(19) yields two roots and thus two roll angles. Obviously only one of these angles is the correct one, and it can be selected by initializing the system to a known roll condition, for example, to zero roll with the aircraft on level ground or flying straight and level, and comparing the two derived roll angles to the initial condition. The velocity processor 24 can be programmed to automatically perform this function.

To determine the pitch angle, PH, the first and third equations from the above matrix, equation (11), are utilized, thus, $$V_h = V_x \cos PH + V_y \sin PH \sin R + V_z \sin PH \cos R \quad \text{Eq. (20)}$$

and, $$-V_y = -V_x \sin PH + V_y \cos PH \sin R + V_z \cos PH \cos R \quad \text{Eq. (21)}$$

Combining terms in these two equations yields, $$V_h = V_x \cos PH + [V_y \sin R + V_z \cos R] \cdot \sin PH \quad \text{Eq. (22)}$$

and, $$-V_y = -V_x \sin PH + [V_y \sin R + V_z \cos R] \cdot \cos PH \quad \text{Eq. (23)}$$

Solving equations (22) and (23) for pitch yields, $$PH = \text{ARCTAN} \frac{[V_x[-V_y]] - [V_y \sin R + V_z \cos R] \cdot V_h}{[V_h[-V_x]] + [V_y \sin R + V_z \cos R] \cdot V_y} \quad \text{Eq. (24)}$$

Since the pitch equation includes the sine and cosine of the roll angle, the roll angle would have to be calculated first.

The velocity processor 24 is adapted to determine the instantaneous pitch and roll angles by utilizing equations (24) and (19), and provides a continuous indication of these two angles to readout 28.

FIG. 5 shows what the aircraft circuitry would be if the aforementioned strapped-down accelerometers were used to obtain the three axial velocities, in place of the Doppler radar equipment of FIG. 1. In FIG. 5, three accelerometers in circuit 45 are attached to the aircraft 11 in such a way that they sense mutually orthogonal accelerations along the roll, pitch and yaw (or X, Y, and Z) axes of the aircraft. The outputs of these accelerometers are applied to integrator 47 which mathematically integrates these signals to yield the axial velocities, $V_x$, $V_y$, and $V_z$. These velocities are then applied to velocity processor 24, which is the same circuit as in FIG. 1, and which functions in the same way to calculate the desired attitude information.

While the invention has been described in connection with illustrative embodiments, obvious variations thereof will occur to those skilled in the art, accordingly, the invention should be limited only by the scope of the appended claims.

I claim:

1. An attitude reference control system for a vehicle comprising:
   a receiver/processor including:
   an antenna for receiving ranging signals from a plurality of orbiting navigation satellites;
   storage apparatus for storing signals representing ephemeris information relating to said satellites;
   a correlator device providing range and range rate signals from said ranging signals and for correlating said range and range rate signals with said stored signals to provide signals representing the vehicle's velocity along the local meridian, $V_n$, its velocity along the local parallel of latitude, $V_e$, and its vertical velocity, $V_v$;
   a directional gyroscope providing a vehicle heading reference signal, H;
   a converter circuit connected to said receiver/processor and said directional gyroscope for correlating said local meridian velocity signal, $V_n$, and said local parallel velocity signal, $V_e$, with said heading reference signal, H, to provide signals representing the along-track velocity, $V_h$, and the cross-track velocity, $V_d$, of said vehicle;
   axial velocity sensing apparatus for measuring and providing signal representing the vehicle's axial velocities, $V_x$, $V_y$ and $V_z$ along the roll, pitch and yaw axes, respectively;
   a velocity correlator connected to said axial velocity sensing apparatus and said converter circuit for correlating said along-track velocity and said cross-track velocity signals with said axial velocity signals to provide signals representing the instantaneous pitch and roll angles of said vehicles; and
   apparatus connected to said velocity correlator for utilizing said pitch and roll angle signals for the navigation of said vehicle.

2. The system of claim 1 wherein said axial velocity sensing apparatus comprises a Doppler radar sensor.

3. The system of claim 1 wherein said axial velocity sensing apparatus comprises three strapped-down accelerometers mounted in said vehicle.

4. A method for calibrating and controlling a primary attitude instrument in a vehicle comprising the steps of:
   receiving ranging signals from a plurality of orbiting navigation satellites;
   processing said ranging signals to provide signals representing the range and range rate of said vehicle with respect to said satellites;
   correlating said range and range rate signals with stored signals representing said satellite orbits to provide signals representing the velocity along the local meridian, $V_n$ the velocity along the local parallel of latitude, $V_e$, and the vertical velocity, $V_v$, of said vehicle;
   providing a signal representing the heading reference, H, of said vehicle;
   correlating the local meridian velocity, $V_n$, and local parallel velocity, $V_e$, signals with said heading reference signal, H, to provide signals representing the along-track velocity, $V_h$, and cross-track velocity, $V_d$, of said vehicle;
   measuring and providing signals representing the vehicle's axial velocities, $V_x$, $V_y$ and $V_z$ along the roll, pitch and yaw axes, respectively;
   correlating said satellite-derived velocity signals, $V_h$, $V_d$ and $V_v$, with said vehicle axial velocity signals, $V_x$, $V_y$ and $V_z$, to provide signals representing the instantaneous roll and pitch angles of said vehicles; and
   adjusting a primary attitude instrument to said instantaneous pitch and roll values.

* * * * *